United States Patent [19]

Shimura et al.

[11] Patent Number: 5,210,844
[45] Date of Patent: May 11, 1993

[54] SYSTEM USING SELECTED LOGICAL PROCESSOR IDENTIFICATION BASED UPON A SELECT ADDRESS FOR ACCESSING CORRESPONDING PARTITION BLOCKS OF THE MAIN MEMORY

[75] Inventors: Nobuyuki Shimura; Kazuo Hibi; Yoshio Oshima, all of Hadano, Japan

[73] Assignees: Hitachi, Ltd.; Hitachi Computer Engineering Co., Ltd., both of Tokyo, Japan

[21] Appl. No.: 412,508

[22] Filed: Sep. 26, 1989

[30] Foreign Application Priority Data

Sep. 29, 1988 [JP] Japan ............... 63-242523

[51] Int. Cl.⁵ ............... G06F 12/06; G06F 12/00
[52] U.S. Cl. ............... 395/425; 364/DIG. 1; 364/266.1; 364/266.4; 364/946; 364/946.3
[58] Field of Search ... 364/200 MS File, 900 MS File; 395/425, 400

[56] References Cited

U.S. PATENT DOCUMENTS

| | | | |
|---|---|---|---|
| 3,609,704 | 9/1971 | Schurter | 395/425 |
| 3,693,165 | 9/1972 | Reiley et al. | 364/200 |
| 3,723,976 | 3/1973 | Alvarez et al. | 364/200 |
| 3,902,163 | 8/1975 | Amdahl et al. | 395/425 |
| 3,902,164 | 8/1975 | Kelley et al. | 364/200 |
| 4,231,088 | 10/1980 | Hammer et al. | 364/200 |
| 4,300,192 | 11/1981 | Couleur et al. | 364/200 |

(List continued on next page.)

FOREIGN PATENT DOCUMENTS

0171475  2/1986  European Pat. Off. .

OTHER PUBLICATIONS

T. L. Borden, et al., "Multiple Operating Systems on One Processor Complex", IBM Systems Journal, vol. 28, No. 1, 1989, pp. 104–122.

Sutton et al., "Processors sharing and partitioning of main storage in the MP system"; vol. 22, No. 5, 1979, pp. 2009–2010.

Finkel; "Space Management"; Prentice-Hall, pp. 34–83, 1986.

Thakkar et al.; "A high-performance memory management scheme"; IEEE, May 1986; pp. 8–20.

Primary Examiner—Thomas C. Lee
Assistant Examiner—Krisna Lim
Attorney, Agent, or Firm—Fay, Sharpe, Beall, Fagan, Minnich & McKee

[57] ABSTRACT

An information processing apparatus having at least one processor and a main storage, accessed by the processor, and capable of providing a plurality of logical information processing apparatus by logically partitioning the information processing apparatus. The information processing apparatus includes a main storage partitioned into a plurality of memory areas, each of the memory areas corresponding to one of the plurality of logical information processing apparatus. The information processing apparatus further includes a first storage unit for storing identification information for each of the memory areas identifying the logical information processing apparatus allocated to each memory and a read unit for reading the identification information from the first storage unit when the main storage is to be accessed by one of the plurality of logical information processing apparatus. Each of the plurality of logical information processing apparatus possesses a unique identification information. The information processing apparatus further includes a comparison unit for comparing the identification information read by the read unit with the identification information of the one logical information processing apparatus which accesses the main storage and a unit for determining if the access to the main storage is allowed, in accordance with the comparison result of the comparison unit. Access by the one logical information processing apparatus is canceled if the determining unit determines the access is not allowable.

11 Claims, 6 Drawing Sheets

U.S. PATENT DOCUMENTS

| | | | |
|---|---|---|---|
| 4,320,456 | 3/1982 | Heise et al. | 364/200 |
| 4,376,297 | 3/1983 | Anderson | 364/200 |
| 4,404,628 | 9/1983 | Angelo | 395/200 |
| 4,459,661 | 7/1984 | Kaneda et al. | 364/200 |
| 4,511,964 | 5/1985 | Georg et al. | 364/200 |
| 4,607,346 | 8/1986 | Hill | 395/425 |
| 4,658,351 | 4/1987 | Teng | 395/650 |
| 4,754,394 | 6/1988 | Brantley, Jr. et al. | 395/400 |
| 4,761,736 | 8/1988 | Di Orio | 364/200 |
| 4,811,216 | 3/1989 | Bishop et al. | 364/200 |
| 4,843,541 | 6/1989 | Bean et al. | 364/200 |
| 4,843,543 | 6/1989 | Isobe | 395/425 |
| 4,914,577 | 4/1990 | Stewart et al. | 395/400 |
| 4,925,311 | 5/1990 | Neches et al. | 364/200 |
| 4,980,822 | 12/1990 | Brantley, Jr. et al. | 364/200 |
| 5,018,060 | 5/1991 | Gelb et al. | 364/200 |
| 5,027,271 | 6/1991 | Curley et al. | 395/725 |
| 5,029,078 | 7/1991 | Iwai | 364/200 |

SYSTEM USING SELECTED LOGICAL PROCESSOR IDENTIFICATION BASED UPON A SELECT ADDRESS FOR ACCESSING CORRESPONDING PARTITION BLOCKS OF THE MAIN MEMORY

BACKGROUND OF THE INVENTION

The present invention relates to an information processing apparatus, and more particularly to an information processing apparatus including a main storage which has a plurality of storage spaces obtained by logically partitioning the main storage.

Generally, the main storage of an information processing apparatus provides a single linear storage space assigned with addresses starting from address "0" to the highest address covering the total memory capacity of the main storage.

In recent years, many cases have risen where a physically single information processing apparatus is logically partitioned into a plurality of information processing apparatus to configure a plurality of information processing systems, and each system is, e.g., alternately started in time division. In such a case, it is necessary for the main storage of the information processing apparatus to provide a single linear storage space to each logically partitioned information processing apparatus (hereinafter called a logical information apparatus). The single linear storage space is assigned addresses starting from address "0" to the highest address which is logically allocated to each logical information apparatus.

Realizing a plurality of independent storage spaces by using a physically single main storage, as described above, is called logical partition of the main storage.

The conventional technique of realizing logical partition of the main storage in an information processing apparatus is described in the specification of U.S. Pat. No. 4,459,661 and other Patents. According to this conventional technique, logical partition of the main storage is realized in a virtual computer environment. The characteristic features of this technique are summarized in the following four points.
(1) When each logically partitioned logical information processing apparatus accesses the main storage, the logical information processing apparatus sends its specific identification information as well as the main storage access address to the main storage.
(2) The main storage has a plurality of register pairs, each including two registers called a base register and an upper limit register.
(3) When one of logical information processing apparatus accesses the main storage, the main storage selects one pair from the plurality of base/upper-limit register pairs, in accordance with the identification information sent with the main storage access address.
(4) The access operation to the main storage by the one logical information processing apparatus has the following restraints as a result of the information stored in the one pair of base/upper-limit registers selected at the above (3).
(a) A base address stored in the base register is added to the main storage access address.
(b) The addition result at the above (a) is compared with an upper limit address stored in the upper limit register.
(c) If the comparison result at the above (b) indicates that the addition result at the above (a) does not exceed the upper limit address, the access operation to the main storage is permitted at the address obtained through addition at the above (a). If the addition result at the above (a) exceeds the upper limit address, the access operation to the main storage is inhibited so that the access is not executed.

In this manner, the above-mentioned conventional technique realizes logical partition of the main storage.

The above-described conventional technique, however, is associated with the following problems.
(1) The above-described conventional technique uses a comparator for checking the upper limit of the main storage access address. It is necessary for a comparator of this type to determine which is the larger or smaller between two values, i.e., the upper limit address and the main storage access address. It is therefore necessary to provide a great amount of hardware logics. The conventional technique is therefore associated with the problem of a necessity of a great number of hardware devices.
(2) The above-described conventional technique has the restraint that the areas of the main storage to be allocated to respective logical information apparatus should be continuous.

Such restraint is not desirable from the standpoint of efficient use of the main storage. For example, if the main storage has an empty capacity m and the empty areas are present continuously within the main storage, then all the empty capacity m can be allocated to one of the logical information processing apparatus. However, if the empty areas are not present continuously and dispersed in several areas, although the total empty capacity m is present within the main storage, only a capacity smaller than the capacity m can be assigned to one of the logical information processing apparatus.

In addition, such a constraint is not desirable from the standpoint of allocation flexibility of the main storage to each logical processing apparatus. For example, it is assumed that an area A within the main storage is assigned to one of the logical information processing apparatus. If, for some reason, the logical information processing apparatus thereafter causes a small area a within the assigned area A to be set off-line as viewed from the apparatus itself the off-line area a, although not used by the logical information apparatus, cannot be assigned to another logical information processing apparatus.

The above-described conventional technique therefore has the problems that it is difficult to efficiently use the main storage, and to improve the allocation flexibility of the main storage to respective logical information processing apparatus.

SUMMARY OF THE INVENTION

It is an object of the present invention to provide an information processing apparatus capable of solving the problems associated with the above-described conventional technqiue.

It is another object of the present invention to provide an information processing apparatus provided with a logically partitioned main storage, which can efficiently use the main storage without an increase in hardware logics, and can make flexible allocation of the main storage.

The particular objects of the present invention are as follows:
(1) An address comparison circuit is removed from the partition check mechanism for the logically partitioned main storage. Since realizing the address comparison circuit requires more than a few hardware logics, the arrangement without the address comparison circuit simplifies the hardware logics and reduces the cost thereof.

(2) Empty areas dispersed within the main storage of the present invention can be allocated to one logical information processing apparatus, thereby eliminating the inconvenience associated with the conventional technique. According to the conventional technique, two or more discontinuous empty areas cannot be assigned to one logical information processing apparatus. Therefore, if several empty areas are present within the main storage, only one empty area of the several empty areas can be assigned to a logical information processing apparatus the remaining large capacity of empty areas cannot be used for that logical information processing apparatus. Further, a small area in the area within the main storage assigned to one logical information processing apparatus can be re-allocated to another logical information processing apparatus, providing more flexibility of the logical partition of the main storage.

The above objects of the present invention can be achieved by the information processing apparatus preferably provided with the first to fifth means as follows:

(1) First means for providing logical information processing apparatus identification information (hereinafter also simply called identification information) for identifying each of a plurality of logical information processing apparatus obtained by logically partitioning a single information processing apparatus.

(2) Second means for storing the identification information provided by the first means, the identification information being provided in correspondence with each area of a plurality of areas obtained by partitioning the main storage.

(3) Third means for reading the identification information during the main storage access operation by one logical information processing apparatus, the identification information being stored in correspondence with each area within the main storage at the main storage access address.

(4) Fourth means for comparing, during the main storage access operation by the one information logical information processing apparatus, the identification information read with the third means with the identification information passessed by the one information processing apparatus assuming the main storage.

(5) Fifth means for determining if the main storage access operation by the one information processing apparatus is allowed or not, on the basis of the comparison result by the fourth means. If access is not allowed, the main storage access operation is canceled by the fifth means.

More preferably, there is provided sixth means for adding together, during the main storage access operation by the one information processing apparatus, the main storage access address and the corresponding origin address among the main storage origin addresses determined for each logical information processing apparatus, wherein the third means reads from the second means the identification information for the main storage area corresponding to the addition value of the addresses.

More preferably, there is provided seventh means for notifying, if the main storage access operation is cancelled by the fifth means, the main storage access originating apparatus of the fact that the main storage access operation was cancelled.

Also more preferably, there is provided eighth means for setting the identification information at the second means in accordance with the configuration information of the logical information processing apparatus. The configuration information is the information on how the logical information processing apparatus are logically partitioned.

The eighth means initializes the second means to be set with the identification information in accordance with the configuration information of the logical information processing apparatus. Particularly, each of a plurality of partitioned areas of the main storage is set with the identification information of the logical information processing apparatus to which the area is allocated.

During the main storage access operation, the adequateness of the main storage access operation is checked by the third, fifth and sixth means. Specifically, during the access operation, the identification information read by the third means in accordance with the main storage access address is compared by the fourth means with the identification information held by the main storage access originating logical information processing apparatus. If the comparison results indicate non-coincidence, the fifth means does not allow the main storage access operation and cancel it. The seventh means notifies the main storage access originating logical information processing apparatus of the fact that the main storage access operation was cancelled.

During the main storage access operation by each logical infromation processing apparatus, the sixth means adds together the main storage access address and the main storage origin address specific to each logical information processing apparatus. As a result, even if each logicl information processing apparatus have the same main storage address, it can use a different area on the physically present main storage.

As described before, according to the present invention, the provision of the first to fifth means enables an information processing apparatus to efficiently use the main storage and realize the flexible logical partition of the main storage.

According to the present invention, the flexible logical partition of the main storage can be advantageously realized while efficiently using empty areas of the main storage without an increase in hardware logics. Specifically, the following advantageous effects can be obtained:

(1) It is possible to dispense with an address comparison circuit in the partition check mechanism for the logically partitioned main storage, so that the hardware logics can be simplified and the cost thereof can be reduced.

(2) It is easy to allocate discontinuous empty areas dispersed within the main storage to one logical information processing apparatus, thereby realizing the flexible logical partition of the main storage and efficiently using the information processing apparatus.

DESCRIPTION OF THE PREFERRED EMBODIMENTS

The embodiments of the information processing apparatus according to the present invention will be described in detail with reference to the accompanying drawings.

Figure 1:
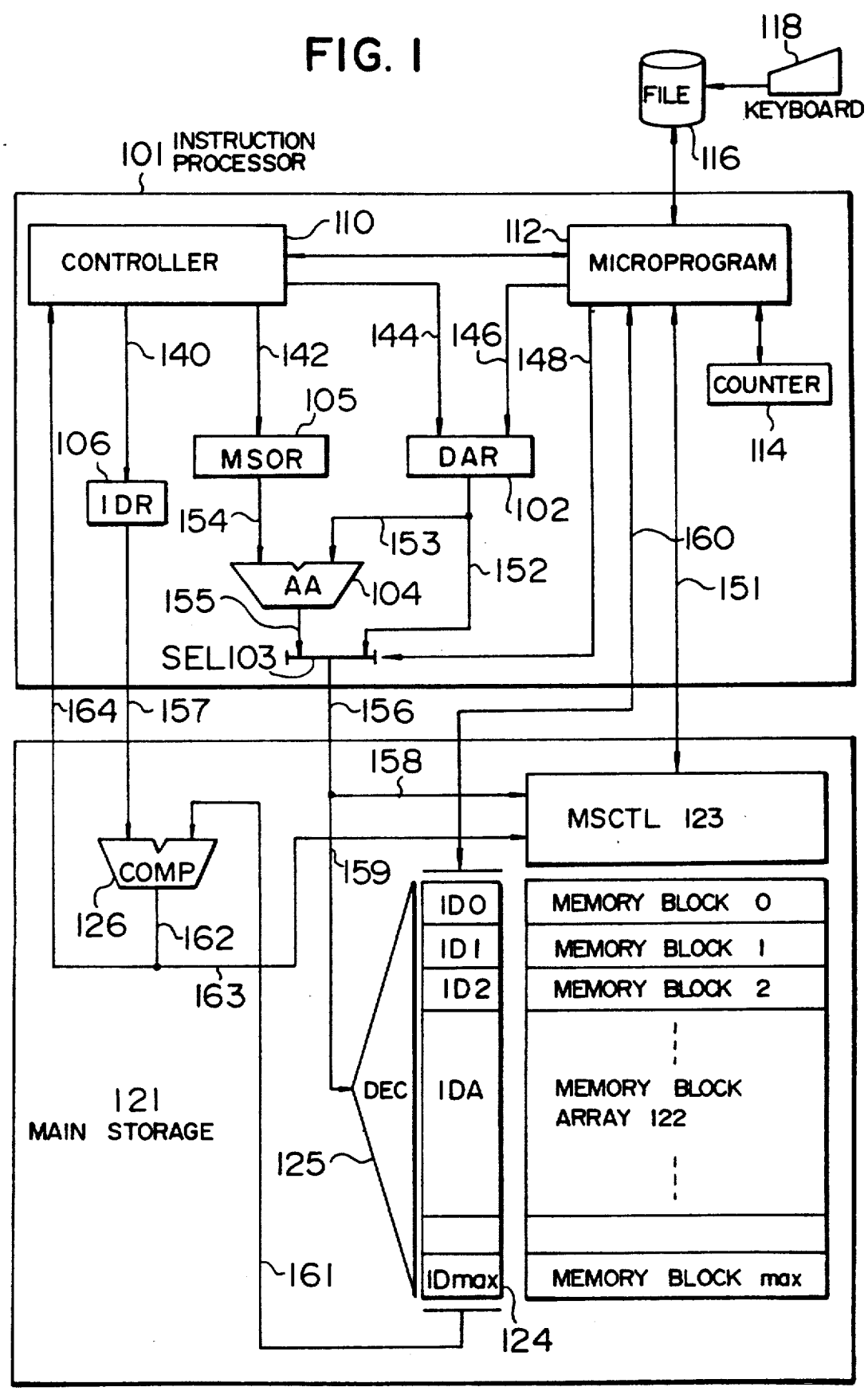
FIG. 1 is a block diagram showing the arrangement of an embodiment of the information processing apparatus according to the present invention.
Figure 2:
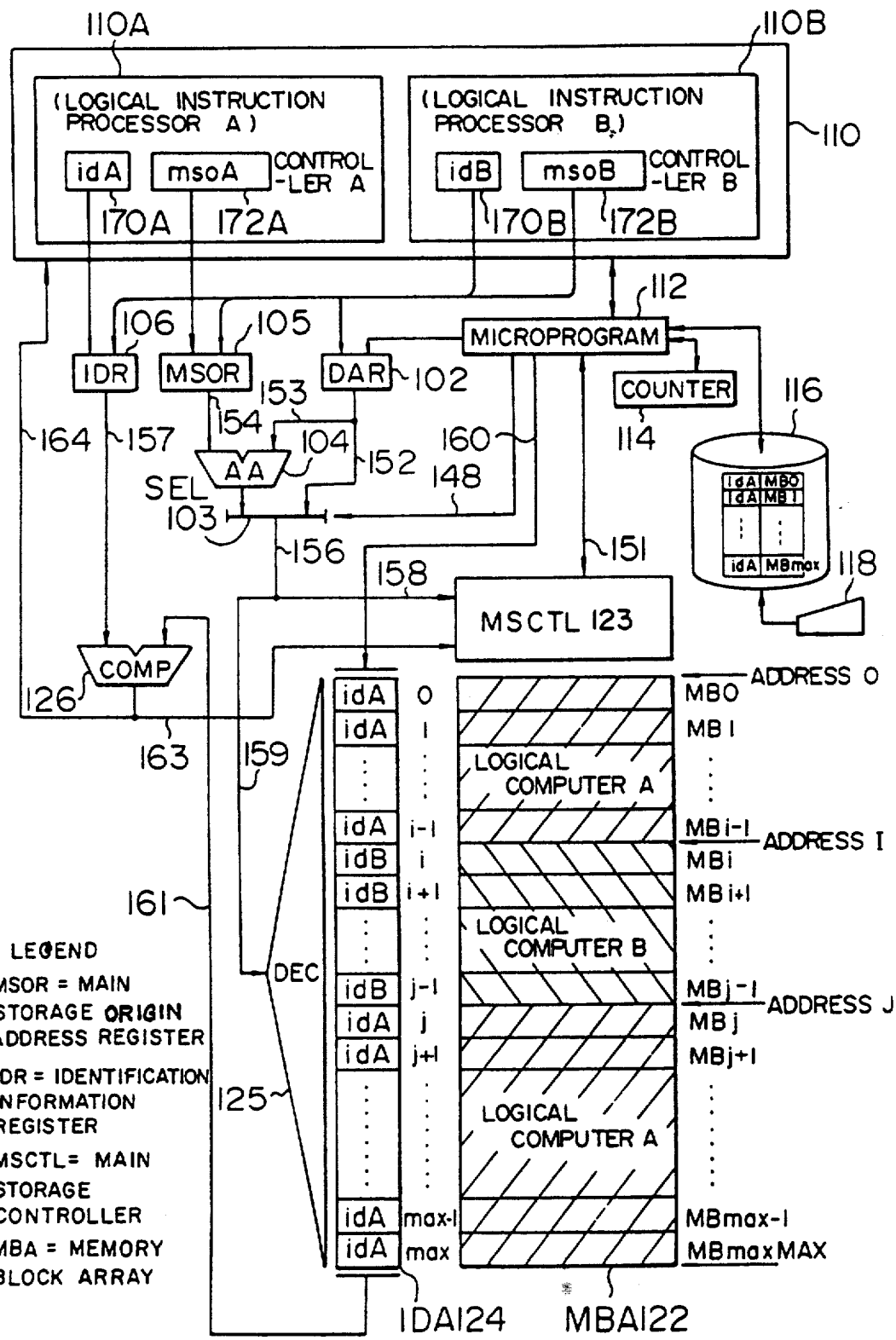
FIG. 2 is a functional block diagram illustrating logical partition of the main storage shown in FIG. 1.
Figure 3:
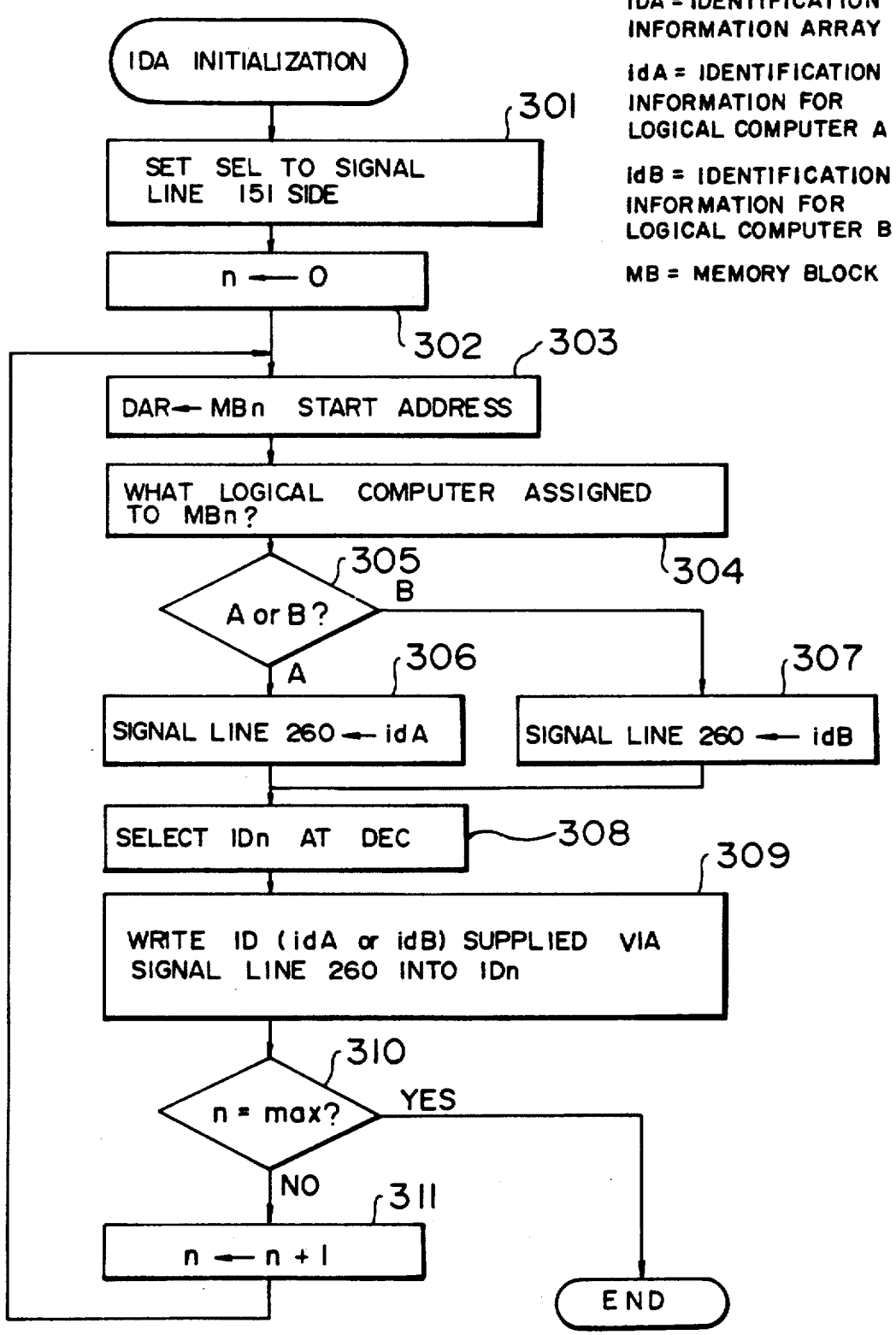
FIGS. 3 and 4 are flow charts illustrating the operation procedure for the logical partition.
Figure 4:
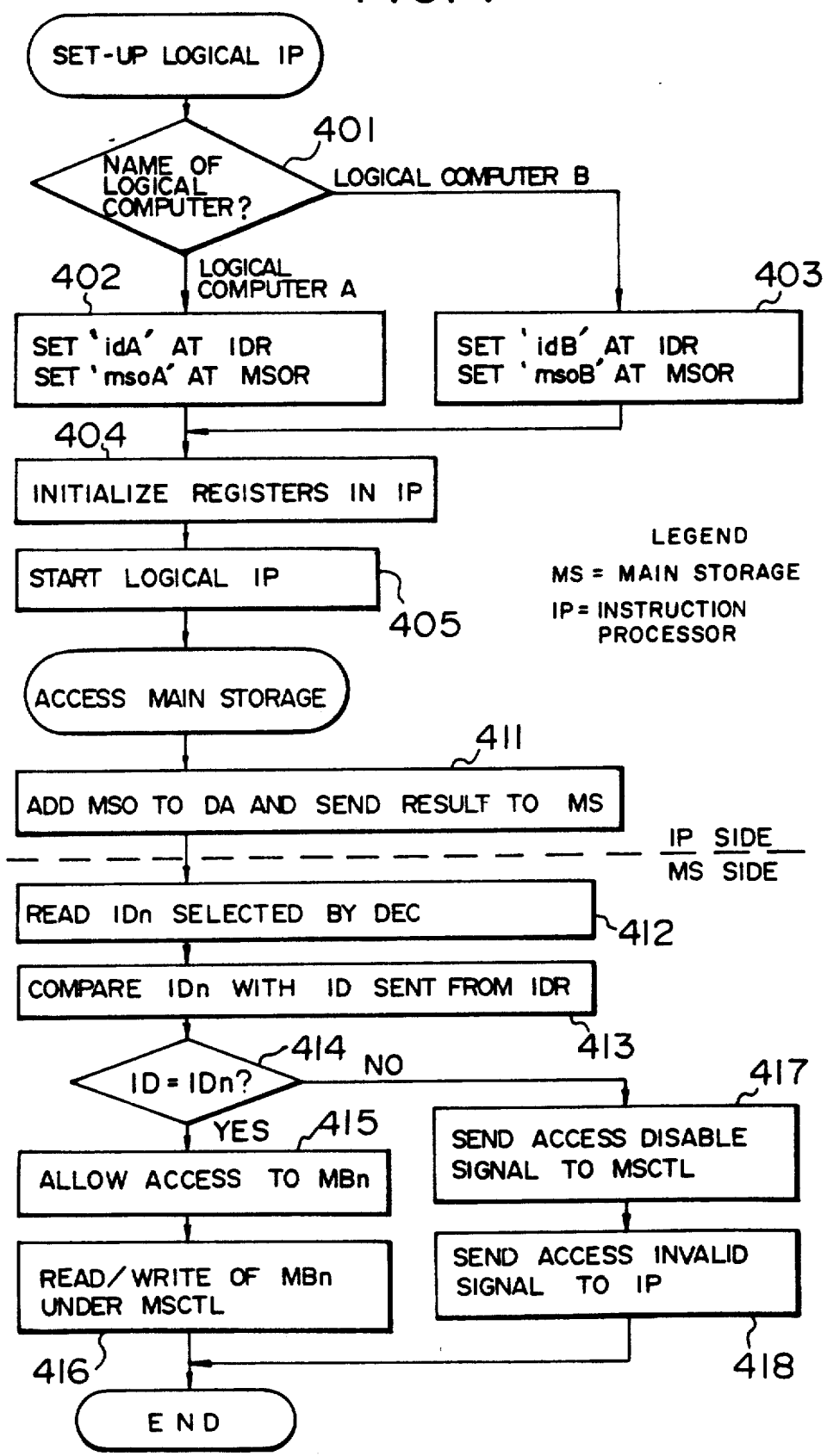

FIG. 1 is a block diagram showing the arrangement of an embodiment of the information processing apparatus according to the present invention, FIG. 2 is a functional block diagram illustrating the logical partition of the main storage shown in FIG. 1; and FIGS. 3 and 4 are flow charts illustrating the operation procedure for the logical partition.

Referring to FIGS. 1 and 2, the information processing apparatus comprises a processor 101, for example, an instruction processor, a controller 110, a microprogram 112, a counter 114, a file 116, an input device 118, for example, a keyboard, a data address register 102, a selector 103, an address adder 104, a main storage origin address register 105, a logical information apparatus identification information register 106, a main storage 121, a memory block array 122, a main storage controller 123, a logical computer identification information array 124, a decoder 125, and a comparator 126.

As shown in FIG. 1, the information processing apparatus according to this embodiment of the invention is constructed of the single instruction processor (hereinafter called an IP) 101 and the single main storage (hereinafter called an MS) 121, both transmitting and receiving data via a signal line 151.

IP 101 is constructed of the controller 110, microprogram 112, data address register (hereinafter called a DAR) 102, selector (hereinafter called a SEL) 103, address adder (hereinafter called an AA) 104, main storage origin address register (hereinafter called an MSOR) 105, logical information processing apparatus identification information register 106 (hereinafter called an IDR), and counter 114. Ms 121 is constructed of the memory block array (hereinafter called an MBA) 122, main storage controller (hereinafter called an MSCTL) 123, logical information processing apparatus identification information array (hereinafter called an IDA) 124, decoder (hereinafter called a DEC) 125, and comparator (hereinafter called a COMP) 126. The microprogram 112 is connected to the file 116 which is connected to the keyboard to write or change the data in the file 116.

In the arrangement described above, DAR 102 is a register which stores, for the data transfer between IP 101 and MS 121, a main storage access address which is sent to SEL 103 and AA 104 respectively via signal lines 152 and 153.

MSOR 105 is a register which stores an offset value for modifying the main storage access address stored in DAR 102. The offset value is supplied from the controller 110 via a signal line 142, and sent to AA 104 via a signal line 154.

AA 104 adds together the main storage access address inputted via signal line 153 and the offset value inputted via signal line 154, the addition result being sent via a signal line 155 to SEL 103.

SEL 103 selects one of the main storage access address sent from DAR 102 via signal line 152 and the address represented by the addition result sent from AA 104 via signal line 155, in response to a selection signal sent from the microprogram 112 via a signal line 148. The select address is sent via a signal line 156 to MS 121.

IDR 106 is a register which stores the logical information processing apparatus identification information (hereinafter the identification information is called an ID) indicating that for what logical information processing apparatus, or processor unit, IP 101 operates as the logical processor. ID is supplied from the controller 110 via a signal line 140 and sent to MS 121 via a signal line 157.

MBA 122 within MS 121 is constructed of a plurality of memory blocks "0" to "max" (hereinafter called MB 0 to MB max). The data in each memory block are read and written under control of MSCTL 123. In this case, the main storage access address is supplied to MSCTL 123 via a signal line 158, each main storage access address being assigned to one of the memory blocks by MSCTL 123. In this embodiment of the invention, it is assumed that the main storage access addresses from address "0" to address "max" are sequentially and continuously assigned to MB 0 to MB max.

IDA 124 is a register array which stores identification information 0 to max (hereinafter called ID 0 to ID max where applicable) corresponding to MB 0 to MB max. The contents ID n indicate that for what logical information processing apparatus MB n operates as the main storage.

DEC 125 selects one ID n from ID 0 to ID max stored in IDA 124, in accordance with the address data supplied via a signal line 159. In this selection, if the address data supplied via signal line 159 represent the address of MB n, then ID n is selected. IP 101 can set the identification information via a signal line 160 at ID n selected by DEC 125, as will be described later. The identification information stored in ID n of IDA 124 selected by DEC 125 is sent to COMP 126 via a signal line 161.

COMP 126 compares the identification information supplied from IDR 106 of IP 101 via a signal line 157 with the identification information stored in IDA 124, and outputs the comparison result onto a signal line 162. The comparison result takes a value of, for example, "0" when both the identification information coincide with each other, and a value of "1" when they are not coincident. When a signal "1" representative of inconsistency between both the identification information is output from COMP 126 onto signal line 162, this signal is then supplied to MSCTL 123 via a signal line 163 as an access disabled signal, and to IP 101 via a signal line 164 as an invalid access signal indicating that the access is invalid.

Upon reception of the access disabled signal via signal line 163, MSCTL 123 cancels the started main storage access operation.

Next, how MS 121 is logically partitioned will be described with reference to FIG. 2.

It is assumed that the information processing apparatus of this embodiment of the invention is logically partitioned into a plurality of information processing apparatus, for example, two information processing apparatus called A and B, and that the information processing apparatus A and B are identified by logical information processing apparatus identification information idA and idB, respectively.

It is further assumed that the logical partition of MS 121 is conducted, for example, in the manner shown in FIG. 2 to allocate partitioned memory areas to the logical information processing apparatus A and B as follows:

MB 0 to MB (i−1) : Logical Information Processing Apparatus A
MB i to MB (j−1) : Logical Information Processing Apparatus B
MB j to MB max : Logical Information Processing Apparatus A Such information is stored in the file 116 as the logical information processing apparatus configuration information.

The controller 110 is also partitioned into controllers 110A and 110B which share the microprogram 112. The controller 110A and 110B are operated alternately, for example, in a time divisional manner.

Referring to FIG. 2, if the logical partition of MS 121 is not made, the memory areas of MS 121 is addressed consecutively from address "0" to address "max". Therefore, in the above example, according to the normal addressing, the memory area from address I to address J is assigned to the logical information processing apparatus B, and the other memory areas from address 0 to address I and from address J to address MAX are assigned to the logical information processing apparatus A.

In the above-described ordinary case, the logical information processing apparatus B cannot use the assigned memory area as the memory area starting from address 0. In addition, the logical information processing apparatuses A and B cannot judge if an arbitrary memory area within MS 121 is assigned to its own information processing apparatus or to other apparatus.

According to this embodiment, the logical partition of MS 121 can be made while allowing each logical information processing apparatus to use the assigned memory area within MS 121 as the memory area starting from address 0 and to judge if an arbitrary memory area is assigned to its own information processing apparatus. The operation of each functional unit shown in FIG. 2 and realizing the logical partition of MS 121 will be described below.

Prior to logically partitioning and starting the information processing apparatus of this embodiment of the invention, first it is necessary as seen in FIG. 2 to set the logical information processing apparatus identification information idA and idB. The following information is set in ID 0 to ID max in IDA 124:

ID 0 to ID (i−1) : idA
ID i to ID (j−1) : idB
ID j to ID max : idA

The identification information for the memory areas MB 0 to MB max in MS 121 is set in the file 116 from the keyboard 118. Specifically, the identification information is set for the memory areas as in the following:

MB 0 to MB (i−1) : idA
MB i to MB (j−1) : idB
MB j to MB max : idA The identification information can be changed or renewed freely from the keyboard.

The operation flow of initially setting the identification information in IDA 124 in FIG. 2 is shown in FIG. 3. The processes of the flow which are executed by the microprogram will be described.

(1) By using a selection signal from the microprogram 112, SEL 103 is set so as to select signal line 152. The data in DAR sent are thereby supplied to SEL 103 (step 301).

(2) The microprogram initializes the counter 114 to be set with a value "0" (step 302).

(3) The microprogram sets the origin address for MB n at DAR 102. Since a value "0" has been set as the value n of the counter at step 302, the origin address of MB 0 is set at DAR 102 (step 303).

(4) It is checked what logical information processing apparatus is allocated to MB n. This check is carried out while referring to the logical information processing apparatus configuration information, i.e., identification information, stored in the file (step 304).

(5) If the logical information processing apparatus assigned with MB n is the logical information processing apparatus A at the check result at step 304, the identification information idA for the logical information processing apparatus A is read from the file 116 and sent onto signal line 160 (steps 305 and 306).

(6) If the logical information processing apparatus assigned with MB n in the logical information processing apparatus B at the check result at step 304, the identification information idB for the logical information processing apparatus B is sent onto signal line 160 (steps 305 and 307).

(7) DEC selects one ID n in IDA 124 in accordance with the address data sent via signal line 159. In this case, SEL 103 has selected signal line 152 at step 301 so that DEC 125 is supplied via signal lines 156 and 159 with the origin address of MB n set at DAR 102. This selected ID n therefore corresponds to MB n (step 308).

(8) The identification information of the logical information processing apparatus sent via signal line 160 is written in ID n selected at step 308. The identification information on signal line 160 is either the identification information idA or idB, respectively set at step 306 or 307 (step 309).

(9) It is checked if the value n of the counter takes the value max of the maximum address of MS 121. If the value is the maximum, the process procedure is terminated. If not (n is not max), the value of the counter is incremented by 1 (n+1→n), and the flow returns to step 303 to repeat the following steps (steps 310 and 311).

The above operations are repeated until the value n of the counter becomes equal to the value max at step 310, so that IDA 124 is initialized to be set with the identification information idA and idB as shown in FIG. 2.

Thereafter, IP 101 shown in FIG. 1 operates as the logical instruction processor for the logical information processing apparatus A or B. The instruction processors for the logical information processing apparatus are called logical instruction processors A and B.

The controller 110 as well is therefore logically partitioned into controllers A 110A and B 110B. The controller 110 alternately activates the instruction processors A and B, for example, in a time divisional manner. To this end, registers 170A and 170B in the controllers A and B store the identification information idA and idB respectively for activation of the logical instruction processors A and B. Upon activation of the instruction processor A (or B), the identification information idA (or idB) is stored in IDR 106 from the register 170A (or 170B). Registers 172A and 172B store the main storage origin addresses for the operation by the logical instruction processors A and B.

The operation of acessing MS 121 after the operation start of the logical instruction processor A or B will be described with reference to the process flow shown in FIG. 4. The processes of the flow are controlled by the controller 110.

(1) It is determined for which logical information processing apparatus the instruction processor was activated as the logical instruction processor (step 401).

(2) When activated at step 401 as the logical instruction processor for the logical information processing apparatus A, i.e., as the logical instruction processor A, IDR 106 is set with the identification information idA for the logical information processing apparatus A supplied from the register 170A, and MSOR 105 is set with the main storage origin address msoA for the logical information processing apparatus A supplied from the register 172A (step 402).

(4) When activated at step 401 as the logical instruction processor for the logical information processing apparatus B, i.e., as the logical instruction processor B, the identification information idB for the logical information processing apparatus B is set from the register 170B at IDR 106, and the main storage origin address msoB for the logical information processing apparatus is set from the register 172B at MSOR 105 (step 403).

The main storage origin address set at MSOR 105 at step 402 or 403 is determined by referring to the logical information processing apparatus configuration information stored in the file 116. Specifically in this embodiment, the main storage origin address msoA is set with "0" and msoB with "1". The main storage origin addresses to be stored in the registers 172A and 172B are freely set in the file 116 from the keyboard 118. The set addresses are loaded via the microprogram in the registers 172A and 172B.

(4) Various registers in the instruction processor are initialized and thereafter, the instruction processor is started. Since the logical information processing apparatus identification information idA or idB has been already set in IDR 106 at step 402 or 403, the instruction processor IP 101 thereafter operates as the logical instruction processor A or B (steps 404 and 405).

The logical instruction processor started operating after steps 401 to 405 frequently performs the main storage access operation and executes predetermined processes. For example, the logical instruction processor started at step 405 is first required to read the first instruction from the main storage.

The process procedure of the main storage access operation by the logical instruction processor will further be described with reference to the flow shown in FIG. 4.

(5) The microprogram causes AA 104 to add together the main storage access address set at DAR 102 and the main storage origin address set at MSOR 105. The addition result is sent via signal line 159 to MS 121 (step 411). During the main storage access operation, SEL 103 is set by a selection signal from signal line 148 so as to select an output from AA 104.

(6) According to the address data sent via signal line 159, DEC 125 in MS 121 selects one ID n within IDA 124 and reads the information therein which is sent onto signal line 161 (step 412).

(7) COMP 126 compares the identification information ID sent via signal line 157 from IDR 106 with ID n read at step 412 (step 413).

(8) If the comparison result at step 413 indicates that ID and ID n coincide with each other, it means that the main storage accessing processor is the logical instruction processor of the logical information processing apparatus assigned MB n so that an access to MB n is allowed (steps 414 and 415).

(9) In response to an access enabled signal sent via signal line 163, MSCTL 123 executes read/write operation relative to MB n in accordance with the address data sent via signal line 158, and thereafter, the processes are terminated (step 416).

(10) If the comparison result at step 413 indicates that ID and ID n are not coincident, it means that the main storage accessing processor is another logical instruction processor different from the logical instruction processor of the logical information processing apparatus assigned MB n so that an access to MB n is not allowed. This access disabled signal is sent via signal line 163 to MSCTL 123 which in turn cancels the main storage access operation (step 417).

(11) This access disabled signal is further sent as an access invalid signal to the logical instruction processor via signal line 164 to terminate the processes (step 418).

According to the embodiment of this invention, the logical partition of the main storage can be made by the above-described series of processes, and the partitioned memory areas can be freely assigned to the instruction processor.

For example, during the operation of the logical information processing apparatus B, the main storage access address from the logical information processor B is added with the contents of MSOB set at MSOR 105, i.e., in this embodiment, address I. The logical instruction processor B therefore can access the memory area as starting from address 0, instead of as starting from address I and ending at address J.

Also during the operation of the logical information processing apparatus A, the main storage access address from the logical information processor A is added with the contents of MSOB set at MSOR 105, i.e., in this embodiment, address 0. The logical instruction processor A therefore can access the memory area assigned to its own processor as starting from address 0, in the same manner as the logical instruction processor A. In this case, in the embodiment of this invention, the memory area from address I to address J is assigned to the logical instruction processor B, so that the main storage access address is given so as not to use this memory area.

The logical information processing apparatuses A and B cannot access the memory area other than the area assigned to their own apparatus. If the memory area other than the area assigned to their own apparatus is accessed, an access invalid signal is returned. In this case, the logical instruction processor can perform an address designation exception process.

It is possible to carry out the main storage access operation without using the offset value set at MSOR 105. In the above embodiment, as the means for reading the contents of the file 116, an auxiliary processor provided externally of IP may be used. COMP 126, IDA 124 and DEC 125 may be provided within IP or within the auxiliary processor.

The above-described embodiment illustrates the logical partition of the main storage while partitioning one information processing apparatus into two logical information processing apparatus. The number of partitioned logical infromation processing apparatus may be larger. The main storage may be partioned into an optional number of areas irrespective of the number of logical information processing apparatus.

Figure 5:
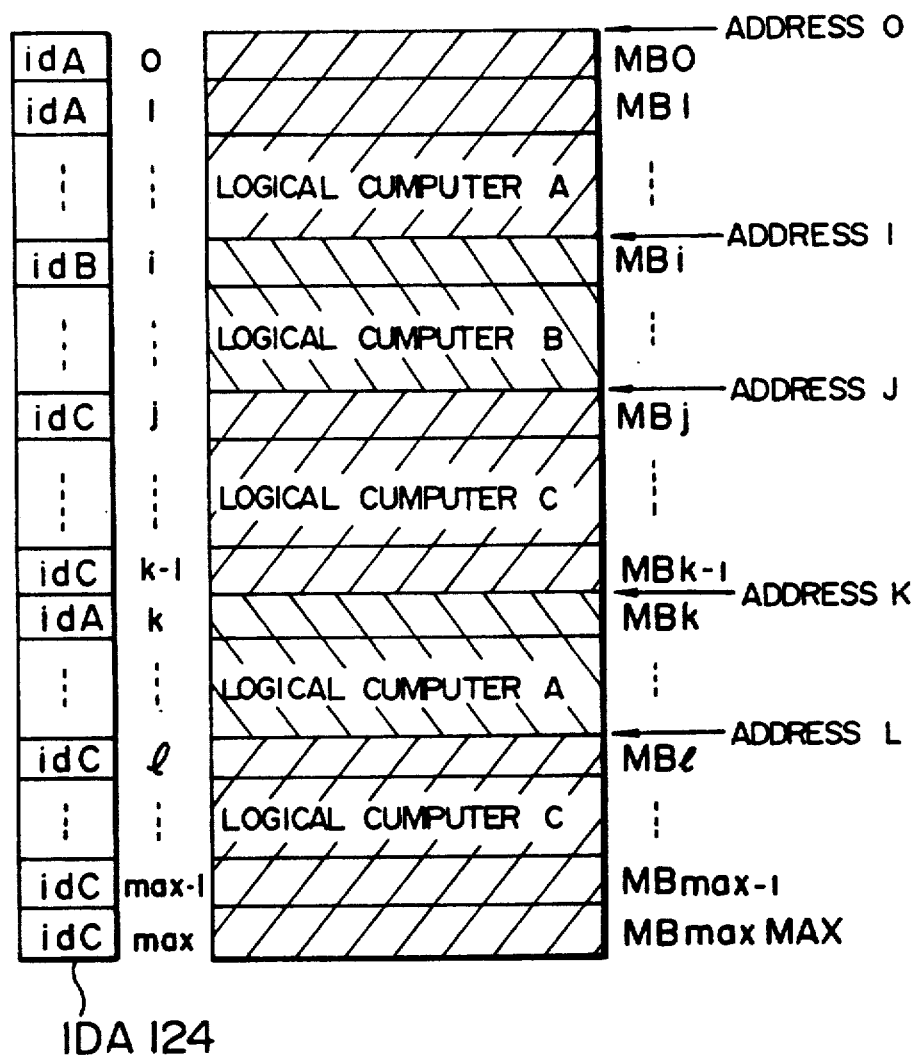
FIG. 5 shows the structure of a modification of the logically partitioned main storage of the information processing apparatus according to the present invention.

For example, if one information processing apparatus is partitioned into the three logical information processing apparatus A, B and C, and the main storage is partitioned as shown in FIG. 5, then the main storage access address from the logical processor A is added with address 0, and the main storage access addresses from the logical processors B and C is added with address I and J, respectively. As the identification information ID 0 to ID max in IDA 124, idA, idB and idC are set in the file 116 as shown in FIG. 5. If an empty area is produced within the main storage, the contents of the file are changed to allow the empty area to be assigned to a desired logical processor.

The above-described embodiment of this invention has been applied to the information processing apparatus having one instruction processor and one main storage. The invention is also applicable to an information processing apparatus having a plurality of instruction processors, an information processing apparatus having one or a plurality of input/output processors, an information processing apparatus having both an instruction processor and input/output processor, and other information processing apparatus.

Figure 6:
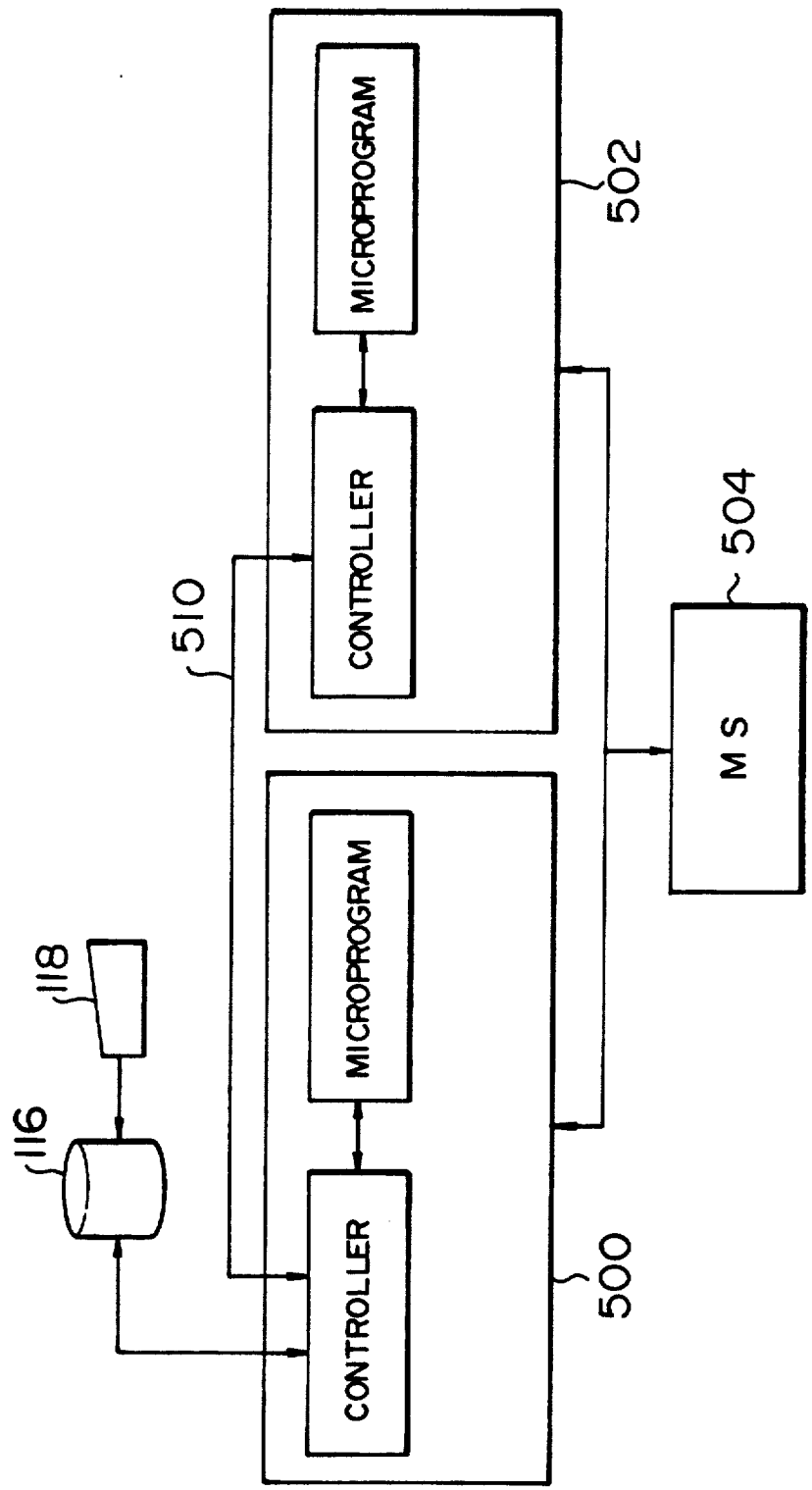
FIG. 6 is a schematic diagram showing the overall arrangement of a modification of the information processing apparatus according to the present invention.

For example, as shown in FIG. 6, it is possible to use two processors 500 and 502 and a main storage 504 shared by two processors. The processor 500 is logically parrtitioned into, e.g., two logical processors A and B, while the processor 502 is logically partitioned into, e.g., two logical processors C and D. Similarly, the main storage is logically partitioned into four memory areas which are assigned to desired logical processors A, B, C and D. In this case, a file 116 commonly used by the two processors is connected to the controller of one processor 500. The data in the file 116 are transferred to the other processor 502 via a data line 50 interconnecting the two controllers. The identification information idA, idB, idC and idD for the areas MB 0 to MB max of the main storage are set in the file 116 from a keyboard 118.

The present invention is not limited to the above embodiment only, but various modifications may be made by those skilled in the art.

We claim:

1. An information processing apparatus having at least one processor which is logically partitioned into a plurality of processor units, each having unique identification information, and a main storage connected to the processor units and accessed by the processor, the information processing apparatus comprising:
    said main storage being selectively partitioned into a plurality of memory areas, each of said memory areas being assigned to one of said plurality of processor units, at least one of said memory areas being discontinuously disposed in said main storage;
    first storage means for storing the identification information for identifying one of said processor units allocated to one of said memory areas;
    means for selecting identification information stored in said first storage means corresponding to one of said memory areas based upon a selected address;
    read means for reading, during an access to said main storage by one of said plurality of processor units, the selected identification information from said first storage means;
    comparison means for comparing said selected identification information read by said read means with said identification information of said one processor unit accessing said main storage;
    means for determining if said access to said main storage is allowed, in accordance with a comparison result by said comparison means;
    means for accessing said main storage in accordance with the access from said one processor unit if said determining means determines said access allowable; and
    cancel means for canceling said access by said one processor unit if said determining means determines said access not allowable.

2. The information processing apparatus according to claim 1, further comprising:
    second storage means for storing origin addresses allocated to said plurality of processor units;
    second read means for reading, during an access to said main storage by one of said plurality of processor units, an origin address for said one processor unit, from said second storage means; and
    additional means for adding an access address used in accessing by said one processor unit to said origin address read by said second read means, to thereby obtain an added address;
    wherein said read means reads from said first storage means said identification information corresponding to the memory area to be accessed by using said added address.

3. The information processing apparatus according to claim 2, further comprising access means for accessing said main storage in accordance with said added address if said determining means determines the access allowable.

4. The information processing apparatus according to claim 1, further comprising notice means for notifying said one processor unit of the cancellation of an access operation if said determining means determines not allowable.

5. The information processing apparatus according to claim 1, further comprising:
    setting means for setting said identification information to be assigned to each of said memory areas; and
    means for storing said identification information set by said setting means, in said first storage means.

6. An apparatus for accessing a main storage in an information processing apparatus having at least one processor which is logically partitioned into a plurality of processor units and the main storage is connected to the processor units and accessed by the processor, the apparatus comprising:
    said main storage being selectively partitioned into a plurality of memory areas, each of said memory areas being assigned to one of said plurality of processor units, at least one of said memory areas being discontinuously disposed in said main storage;
    first storage means for storing the identification information for identifying one of said processor units allocated to one of said memory areas;

means for selecting identification information stored in said first storage means corresponding to one of said memory areas based upon a selected address;

read means for reading, during an access to said main storage by one of said plurality of processor units which has unique identification information, the selected identification information from said first storage means;

comparison means for comparing said selected identification information read by said read means with the unique identification information of said one processor unit for identifying the processor unit which accessed said main storage;

means for determining if said access to said main storage is allowed, in accordance with a comparison result by said comparison means;

means for accessing said main storage in accordance with the access from said one processor unit if said determining means determines said access allowable; and, cancel means for canceling said access by said one processor unit if said determining means determines said access not allowable.

7. A method for accessing a main storage in an information processing apparatus having at least one processor which is logically partitioned into plural processor units, the main storage connected to the processor units and accessed by the processor and a first storage means operatively connected therein, wherein the processor performs the steps of:

partitioning said main storage into a plurality of memory areas in accordance with input parameters, each of said memory areas being assigned to one of said plurality of processor units;

storing into the first storage means identification information for identifying one of said processor units allocated to one of said memory areas;

selecting identification information stored in said first storage means corresponding to one of said memory areas based upon a selected address;

reading during an access to said main storage by one of said plurality of processor units which has unique identification information, the selected identification information from said first storage means;

comparing said selected identification information read with the unique identification information of said one processor unit for identifying the processor unit which accessed said main storage;

determining if said access to said main storage is allowed in accordance with the comparing;

accessing said memory in accordance with the access from said one processor unit if said determining determines said access allowable; and, canceling said access by said one processor unit if said determining step determines said access not allowable.

8. An information processing apparatus including a processor which is logically partitioned into a plurality of processor units, each of the plurality of processor units having unique identification information, and a main storage which is logically partitioned into a plurality of memory blocks, the information processing apparatus comprising:

allocating means for allocating first memory blocks to a first processor unit and second memory blocks to a second processor unit in accordance with input parameters;

storage means for storing a plurality of first identification information of the processor units in accordance with a result of the allocating means;

register means for storing second identification information, the second identification information identifying one of the first and second processor units performing an access to the main storage;

selection means for selecting one of the plurality of first identification information stored in said storage means to obtain a selected first identification information corresponding to one of said memory blocks based upon a selected address;

read means for reading the selected first identification information during an access to the main storage;

comparing means for comparing the selected first identification information and the second identification information, wherein the comparing means is a single comparator device;

determining means for determining whether the access is allowed in accordance with a result of the comparing means;

access means for accessing the main storage if access is allowed; and, cancel means for canceling the access if access is not allowed.

9. The information processing apparatus according to claim 8 wherein the first memory blocks are continuous and the second memory blocks are continuous.

10. The information processing apparatus of claim 8 wherein at least one of the first and second memory blocks are discontinuous.

11. A method for accessing a main storage in an information processing apparatus including a processor which is logically partitioned into a plurality of processor units, each processor unit having unique identification information, and a main storage which is logically partitioned into a plurality of memory blocks, the processor implementing the method comprising steps of:

allocating first memory blocks to a first processor unit and second memory blocks to a second processor unit in accordance with input parameters;

storing in a first storage a plurality of first identification information of the processor units in accordance with the allocating;

storing a second identification information, the second identification information identifying one of the first and second processing units;

selecting one of the plurality of first identification information stored in said first storage to obtain a selected first identification information corresponding to one of said memory blocks based upon a selected address;

reading the selected first identification information corresponding to the selected memory block;

comparing the selecting first identification information corresponding to the selected memory block and the second identification information;

determining whether an access to the main storage is allowed in accordance with the comparing;

accessing the main storage if the access is allowed; and, canceling the access if the access is not allowed.

* * * * *